(12) United States Patent
Bowness

(10) Patent No.: US 10,951,412 B2
(45) Date of Patent: Mar. 16, 2021

(54) CRYPTOGRAPHIC DEVICE WITH ADMINISTRATIVE ACCESS INTERFACE UTILIZING EVENT-BASED ONE-TIME PASSCODES

(71) Applicant: RSA Security LLC, Bedford, MA (US)

(72) Inventor: Piers Bowness, Boxboro, MA (US)

(73) Assignee: RSA Security LLC, Bedford, MA (US)

( * ) Notice: Subject to any disclaimer, the term of this patent is extended or adjusted under 35 U.S.C. 154(b) by 0 days.

(21) Appl. No.: 16/249,474

(22) Filed: Jan. 16, 2019

(65) Prior Publication Data

US 2020/0228338 A1    Jul. 16, 2020

(51) Int. Cl.
*H04L 9/32*    (2006.01)

(52) U.S. Cl.
CPC .......... *H04L 9/3228* (2013.01); *H04L 9/3213* (2013.01); *H04L 9/3234* (2013.01)

(58) Field of Classification Search
CPC .... H04L 9/3228; H04L 9/3234; H04L 9/3213
USPC ........................................................ 713/159
See application file for complete search history.

(56) References Cited

U.S. PATENT DOCUMENTS

| 4,720,860 A | 1/1988 | Weiss |
| 5,168,520 A | 12/1992 | Weiss |
| 5,361,062 A | 11/1994 | Weiss et al. |
| 5,428,349 A | 6/1995 | Baker |

(Continued)

FOREIGN PATENT DOCUMENTS

| EP | 2026494 A1 | 2/2009 |
| GB | 2433147 A | 6/2007 |

(Continued)

OTHER PUBLICATIONS

RSA, "RSA SecurID 800 Authenticator—Hybrid Authenticator that Provides a Seamless User Experience Across Multiple Applications Using Multiple Credentials," https://www.emc.com/collateral/data-sheet/9651-sid800-ds.pdf, Data Sheet, 2005-2009, 2 pages.

(Continued)

*Primary Examiner* — Kambiz Zand
*Assistant Examiner* — Aubrey H Wyszynski
(74) *Attorney, Agent, or Firm* — Danielson Legal LLC

(57) ABSTRACT

A cryptographic device comprises a processor coupled to a memory and is configured to maintain an event counter characterizing a number of successful administrative accesses to the cryptographic device. The cryptographic device is further configured to receive an event-based one-time passcode for a given administrative access attempt, to compare the received event-based one-time passcode to an expected event-based one-time passcode determined as a function of a current value of the event counter, and to grant or deny the given administrative access attempt based at least in part on a result of the comparing. The cryptographic device may store an administrative seed value, with the expected event-based one-time passcode being determined as a function of the administrative seed value and the current value of the event counter. The cryptographic device illustratively comprises a smartcard, a hardware or software authentication token, an Internet-of-Things (IoT) device, or other type of processor-based device having an administrative access interface.

19 Claims, 2 Drawing Sheets

(56) References Cited

U.S. PATENT DOCUMENTS

| | | | |
|---|---|---|---|
| 5,870,471 | A | 2/1999 | Wootton et al. |
| 7,409,705 | B2 | 8/2008 | Ueda et al. |
| 8,224,887 | B2 | 7/2012 | Singerle, Jr. |
| 8,245,292 | B2 | 8/2012 | Buer |
| 8,412,928 | B1 | 4/2013 | Bowness |
| 8,504,842 | B1 | 8/2013 | Meacham |
| 8,572,713 | B2 | 10/2013 | Buer |
| 8,752,146 | B1 | 6/2014 | van Dijk et al. |
| 8,752,153 | B2 | 6/2014 | Vysogorets et al. |
| 8,959,195 | B1 | 2/2015 | Niranjan et al. |
| 8,966,276 | B2 | 2/2015 | Nanopoulos et al. |
| 9,071,424 | B1 | 6/2015 | Bowness et al. |
| 9,147,063 | B1 | 9/2015 | Florissi et al. |
| 9,191,386 | B1 | 11/2015 | Yaron et al. |
| 9,225,700 | B1 | 12/2015 | Dotan et al. |
| 9,225,717 | B1 | 12/2015 | Brainard et al. |
| 9,411,948 | B1 | 8/2016 | Suresh et al. |
| 9,432,339 | B1 | 8/2016 | Bowness |
| 2003/0204726 | A1 | 10/2003 | Kefford et al. |
| 2007/0061589 | A1 | 3/2007 | Ulmer et al. |
| 2007/0088952 | A1 | 4/2007 | Hewitt et al. |
| 2007/0180504 | A1 | 8/2007 | Hung |
| 2007/0186105 | A1 | 8/2007 | Bailey et al. |
| 2008/0009345 | A1 | 1/2008 | Bailey et al. |
| 2008/0148057 | A1 | 6/2008 | Hauw |
| 2009/0282247 | A1 | 11/2009 | Kirkup et al. |
| 2009/0289916 | A1 | 11/2009 | Dai |
| 2010/0031200 | A1 | 2/2010 | Chen |
| 2010/0150348 | A1 | 6/2010 | Fairbanks et al. |
| 2010/0242104 | A1 | 9/2010 | Wankmueller et al. |
| 2011/0060913 | A1* | 3/2011 | Hird ................. G06F 21/34 713/184 |
| 2011/0119746 | A1 | 5/2011 | Yang |
| 2013/0014248 | A1 | 1/2013 | McLaughlin et al. |
| 2017/0118196 | A1* | 4/2017 | Ponsini ............... H04L 63/0823 |

FOREIGN PATENT DOCUMENTS

| | | |
|---|---|---|
| WO | 2011124275 A1 | 10/2011 |
| WO | 2012001428 A1 | 1/2012 |

OTHER PUBLICATIONS

J-C. Liou et al., "On Improving Feasibility and Security Measures of Online Authentication," International Journal of Advanced Computer Science and Technology (IJACST), 2010, p. 6-16, vol. 2, No. 4.

A.J. Menezes et al., "Handbook of Applied Cryptography," CRC Press, Oct. 1996, 794 pages.

* cited by examiner

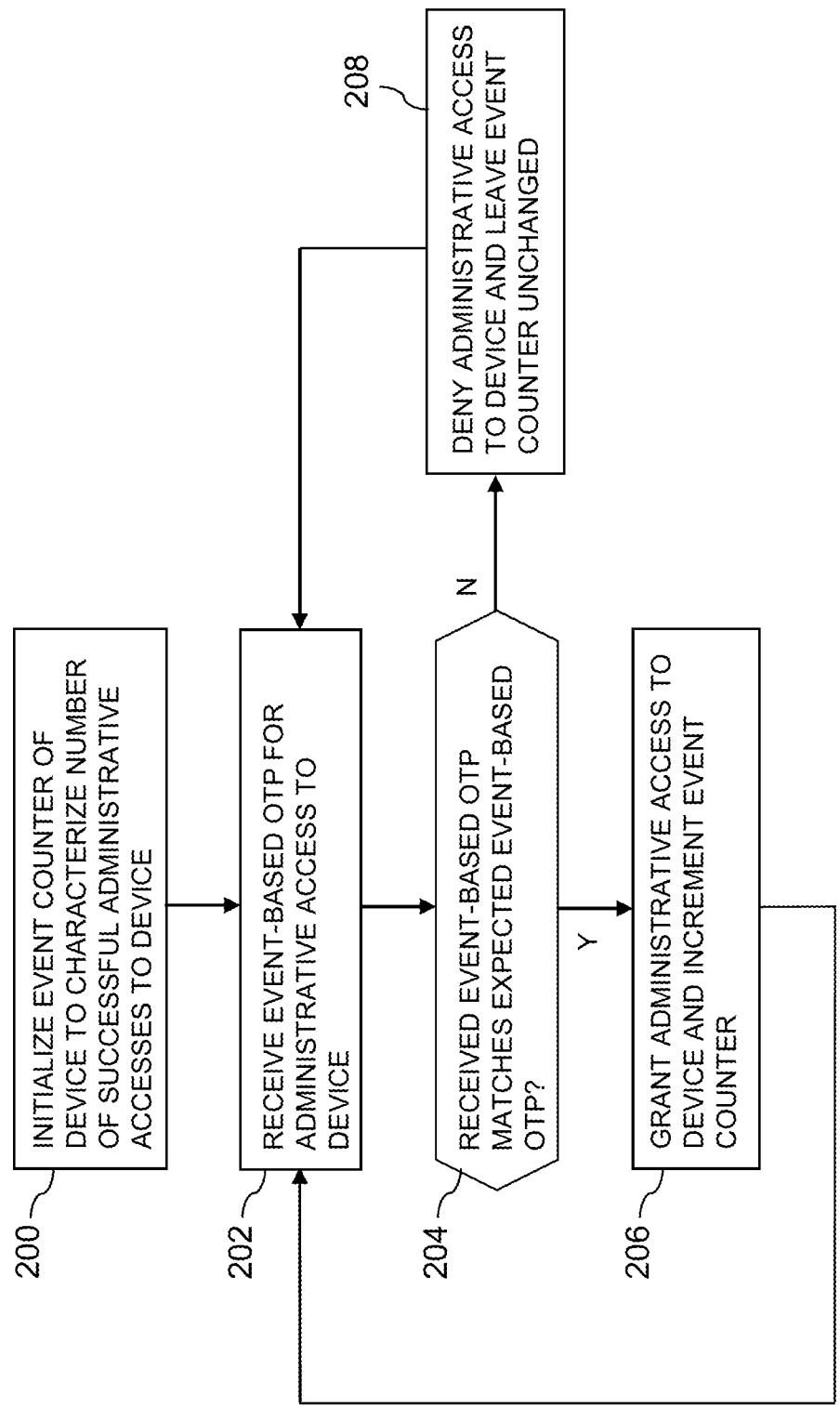

CRYPTOGRAPHIC DEVICE WITH ADMINISTRATIVE ACCESS INTERFACE UTILIZING EVENT-BASED ONE-TIME PASSCODES

FIELD

The field relates generally to authentication systems in which authentication is based at least in part on cryptography, and more particularly to authentication techniques implemented using cryptographic devices.

BACKGROUND

Cryptographic devices such as smartcards are often configured to permit controlled access by an authenticated administrator. Such administrative access to a cryptographic device in conventional practice typically requires entry of a predetermined static access code that is stored in the cryptographic device in conjunction with its manufacture. More particularly, presentation of the correct predetermined static access code to an administrative interface of the cryptographic device serves to "unlock" the device so as to thereby permit an administrator to alter sensitive device-specific authentication information, such as a personal identification number (PIN) of a user of the cryptographic device. The static access code in some arrangements of this type is also referred to as a PIN Unlock Key (PUK). The same static PUK value is typically utilized throughout the lifetime of the cryptographic device.

SUMMARY

Illustrative embodiments of the present invention provide cryptographic devices in which administrative access is controlled through the use of event-based one-time passcodes (OTPs) rather than PUKs or other static access codes.

In one embodiment, a cryptographic device comprises a processor coupled to a memory and is configured to maintain an event counter characterizing a number of successful administrative accesses to the cryptographic device. The cryptographic device is further configured to receive an event-based OTP for a given administrative access attempt, to compare the received event-based OTP to an expected event-based OTP determined as a function of a current value of the event counter, and to grant or deny the given administrative access attempt based at least in part on a result of the comparing.

In some embodiments, the cryptographic device stores an administrative seed value, with the expected event-based OTP being determined as a function of the administrative seed value and the current value of the event counter.

The cryptographic device illustratively comprises a smartcard, a hardware or software authentication token, an Internet-of-Things (IoT) device, or other type of processor-based device having an administrative access interface.

These and other illustrative embodiments include, without limitation, apparatus, systems, methods and computer program products comprising processor-readable storage media.

BRIEF DESCRIPTION OF THE DRAWINGS

FIG. 2 is a flow diagram of a process for cryptographic device administration utilizing event-based OTPs in an illustrative embodiment.

DETAILED DESCRIPTION

Figure 1:
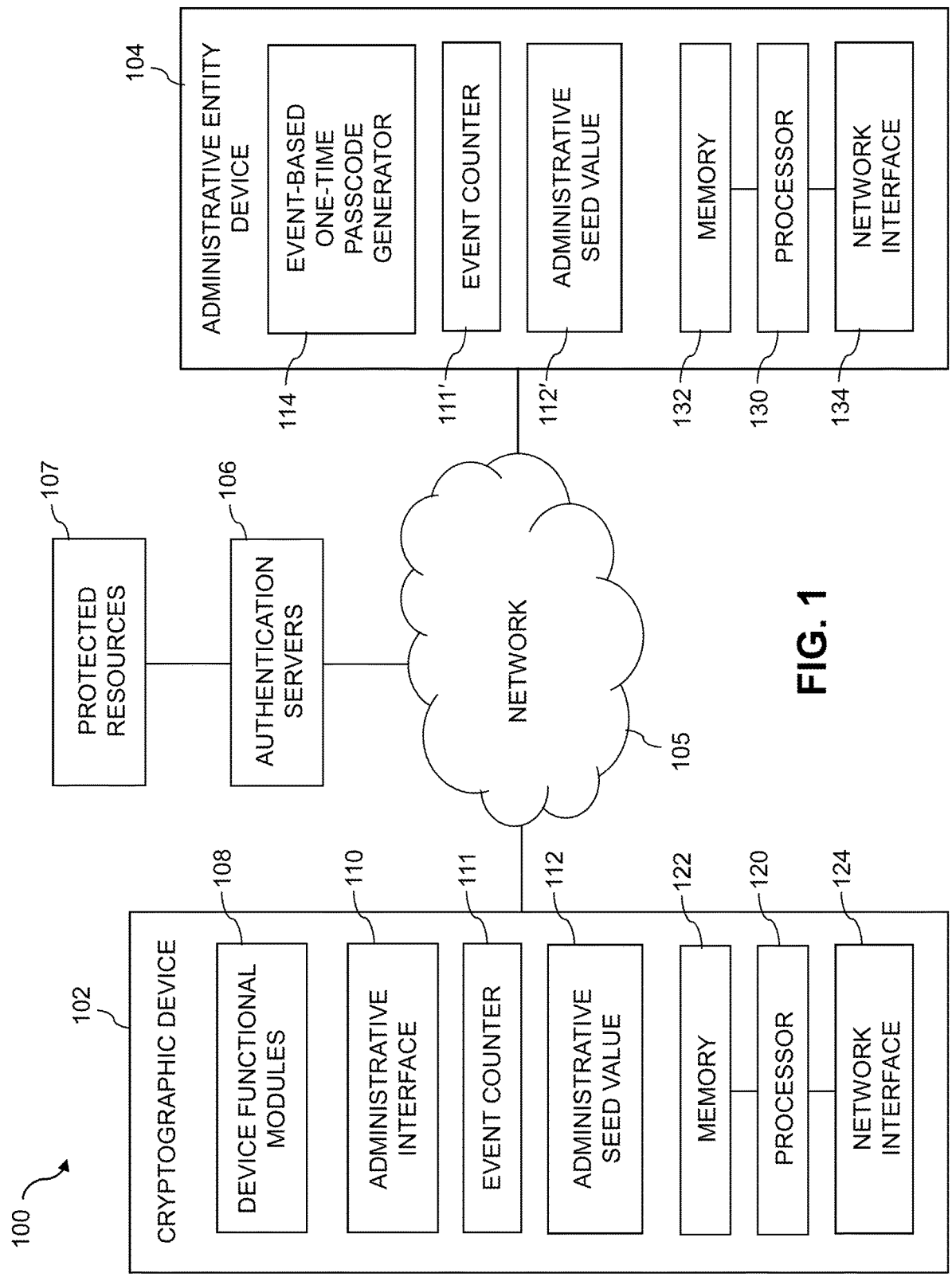
FIG. 1 is a block diagram of an authentication system configured to incorporate functionality for cryptographic device administration utilizing event-based OTPs in an illustrative embodiment.

Illustrative embodiments will be described herein with reference to exemplary authentication systems and associated cryptographic devices, administrative entity devices, authentication servers and other processing devices. It is to be appreciated, however, that illustrative embodiments are not restricted to use with the particular system and device configurations shown. Accordingly, the term "authentication system" as used herein is intended to be broadly construed, so as to encompass any type of information processing system in which authentication for purposes of cryptographic device administration is implemented at least in part utilizing event-based OTPs.

FIG. 1 shows authentication system 100 implementing cryptographic device administration functionality utilizing event-based OTPs in an illustrative embodiment. The authentication system 100 comprises a cryptographic device 102 that communicates with an administrative entity device 104 over a network 105. Also coupled to the network 105 is a set of authentication servers 106 each of which controls access to one or more protected resources 107.

The cryptographic device 102 illustratively comprises, for example, a smartcard, a hardware authentication token, a software authentication token, an IoT device, or other type of processor-based device having an administrative access interface. Such devices are examples of what are also referred to herein as processing devices each comprising at least one processor coupled to at least one memory.

The cryptographic device 102 in some embodiments comprises a mobile telephone, a laptop or tablet computer, a desktop computer, a gaming console or another type of user device as well as various combinations of multiple distinct devices. For example, the cryptographic device 102 can comprise a mobile telephone that implements a software authentication token via a mobile application running on the mobile telephone. Each such cryptographic device may be associated with a corresponding user that authenticates to at least one of the authentication servers 106 in order to obtain access to one or more of the protected resources 107, where "user" as the term is applied herein should be generally construed so as to encompass, for example, a human user or an associated hardware or software entity.

The administrative entity device 104 can similarly comprise a mobile telephone or computer, or any other type of processing device through which an administrative entity can administer the cryptographic device 102 utilizing event-based OTPs as will be described in more detail below.

It is therefore apparent that terms such as "cryptographic device" and "administrative entity device" as used herein are intended to be broadly construed, and should not be construed as being limited to particular device types. A "cryptographic device" as that term is broadly used herein is intended to encompass any device that incorporates at least some cryptographic functionality, such as an ability to verify submitted event-based OTPs for purposes of granting administrative access to that device.

The administrative entity device 104 is assumed to be associated with at least one administrative entity of the system 100, such as a security administrator responsible for maintaining and updating PIN values for respective cryptographic devices utilized by enterprise users.

The network 105 may comprise, for example, a global computer network such as the Internet, a wide area network (WAN), a local area network (LAN), a satellite network, a telephone or cable network, a cellular network, a wireless network implemented using protocols such as WiFi, WiMAX, Bluetooth, Zigbee or near-field communication (NFC), or various portions or combinations of these and other types of networks. The term "network" as used herein is therefore intended to be broadly construed.

A given one of the authentication servers 106 may comprise any type of processing device or set of such devices that is operative to authenticate a passcode or other credential submitted by the cryptographic device 102. It need not be a network-based server, and may be implemented as a portion of a device that performs other functions, as a combination of multiple servers or other devices, or in other forms.

A given one of the protected resources 107 may comprise, for example, a multi-user computer system, a web site, an application, etc. Such a protected resource in some embodiments may reside at least in part on the cryptographic device 102 rather than being separate from that device as illustrated in the figure.

The cryptographic device 102 in the present embodiment comprises device functional modules 108 that will vary depending upon the type of device. For example, if the cryptographic device 102 comprises a hardware authentication token or a software authentication token, the device functional modules 108 are illustratively configured to generate OTPs for submission to the authentication servers 106 as part of an authentication process for obtaining access to one or more of the protected resources 107. As another example, if the cryptographic device 102 comprises an IoT device, the device functional modules 108 are illustratively configured to perform various types of sensing and reporting consistent with the particular deployment environment of the IoT device. More particular examples of IoT devices include industrial sensors and/or controllers, Internet thermostats, or other types of sending and reporting devices configured for machine-to-machine (M2M) communication.

Other types of device functional modules can be included in other types of cryptographic devices. For example, in other embodiments the cryptographic device 102 can comprise a chip-based credit card, an NFC fob or a USB dongle. The particular device functional modules are adapted accordingly.

The cryptographic device 102 further comprises an administrative interface 110, an event counter 111, and an administrative seed value 112.

The administrative entity device 104 similarly comprises an event counter 111' corresponding to the event counter 111 of the cryptographic device 102, and an administrative seed value 112' corresponding to the administrative seed value 112 of the cryptographic device 102. The administrative entity device 104 further comprises an event-based OTP generator 114 for generating event-based OTPs.

The event counters 111 and 111' maintained in the respective cryptographic device 102 and the administrative entity device 104 are each illustratively configured to characterize a number of successful administrative accesses to the cryptographic device 102 by the administrative entity device 104. A given "successful administrative access" is one in which a received event-based OTP has been determined by the cryptographic device 102 to be valid, such that administrative access is granted to the requesting entity.

The administrative seed values 112 and 112' stored in the respective cryptographic device 102 and the administrative entity device 104 each illustratively comprise the same cryptographic key or other shared secret. That cryptographic key or other shared secret is utilized in conjunction with the administrative entity device 104 authenticating to the cryptographic device 102 via the administrative interface 110 in order to obtain administrative access to the cryptographic device 102.

The administrative seed values 112 and 112' in some embodiments comprise static seed values that are randomly generated. The administrative seed value 112 can be programmed into the cryptographic device 102 during manufacture. The administrative seed value 112 in some cases may be changed by the administrative entity device 104, after that device obtains administrative access to the cryptographic device 102.

The administrative seed values for respective multiple instances of cryptographic device 102 can be stored in a single instance of the administrative entity device 104, possibly in the form of a set of stored random keys or other types of administrative seed values.

Such values in some embodiments are stored in a token record file associated with the multiple cryptographic devices. The token record file is loaded into the administrative entity device 104, and utilized to generate event-based OTPs for accessing respective ones of the multiple cryptographic devices.

The administrative entity device 104 can therefore implement multiple event counters and multiple administrative seed values, with one of the event counters and one of the seed values being used to generate event-based OTPs for obtaining administrative access to a corresponding one of the multiple cryptographic devices.

In such arrangements, different random initial values for the event counters, and different random administrative seed values, can be used for respective ones of the multiple cryptographic devices.

The administrative entity device 104 in some embodiments is configured to periodically update one or more such values. For example, the cryptographic device 102 and the administrative entity device 104 can cooperate during a successful administrative access to perform a random number of increments of their respective event counters, so as to ensure that previous event-based OTPs will clearly fall outside of a current window of acceptable values. Seed values can also be altered in a similar manner.

The administrative access to cryptographic device 102 once obtained illustratively allows the administrative entity device 104 to alter sensitive device-specific authentication information of the cryptographic device 102, such as a PIN of a user of the cryptographic device 102. As described previously, under conventional practice such administrative access to a cryptographic device typically requires entry of a predetermined static access code, such as a PUK, with the same static PUK value typically being utilized throughout the lifetime of the cryptographic device. Arrangements of this type are problematic in that exposure of the PUK or other static access code irreversibly destroys the security of the cryptographic device. As will be described below, the system 100 is configured to solve these and other problems of conventional practice by configuring cryptographic device 102 and administrative entity device 104 such that administrative access to the cryptographic device 102 is controlled through the use of event-based OTPs rather than PUKs or types of other static access codes.

In conjunction with a given attempt by the administrative entity device 104 to obtain administrative access to the cryptographic device 102, also referred to herein as an "administrative access attempt," the cryptographic device 102 receives via its administrative interface 110 an event-based OTP for the given administrative access attempt. The cryptographic device 102 compares the received event-based OTP to an expected event-based OTP determined as a function of a current value of the event counter 111, and grants or deny the given administrative access attempt based at least in part on a result of the comparison.

Accordingly, in this embodiment, the administrative interface 110 of the cryptographic device 102 does not require submission of a static access code for a successful administrative access.

In some embodiments, the expected event-based OTP is more particularly determined in the cryptographic device 102 as a function of the administrative seed value 112 and the current value of the event counter 111.

For example, an expected event-based OTP may be a cryptographic function of the administrative seed value 112 and the current value of the event counter 111, such as a keyed hash of the event counter and other information available to both the cryptographic device 102 and the administrative entity device 104. A wide variety of other cryptographic functions may be used in comparing expected and received event-based OTPs.

The event counter 111 is illustratively set to an initial value in conjunction with manufacture of the cryptographic device 102. For example, the event counter 111 may be set to an initial value of zero, or to a random value. Other arrangements can be used to initialize the event counter 111. The event counter 111 is incremented by the cryptographic device 102 each time a successful administrative access occurs.

The initial value of the event counter 111 and the administrative seed value 112 are illustratively provided to the administrative entity device 104 via an out-of-band channel, such as a secure connection through a different network, for use by the administrative entity device 104 in generating event-based OTPs for respective administrative access attempts. The received initial value of the event counter is utilized by the administrative entity device 104 to initialize its event counter 111'. The received administrative seed value is stored by the administrative entity device 104 as administrative seed value 112'.

A given event-based OTP generated by the event-based OTP generator 114 is generated as a function of a current value of event counter 111' and the stored administrative seed value 112'. The cryptographic device 102 can therefore utilize a current value of event counter 111 and the stored administrative seed value 112 to generate an expected event-based OTP in order to determine if a given received event-based OTP matches the expected event-based OTP, illustratively through the use of a designated cryptographic function of those values. The cryptographic device 102 and the administrative entity device 104 illustratively maintain their respective event counters 111 and 111' in substantial synchronization based on the number of successful administrative accesses made by the administrative entity device 104 to the cryptographic device 102.

The cryptographic device 102 in maintaining the event counter 111 illustratively increments the event counter for each of a plurality of successful administrative accesses to the cryptographic device 102, including any successful administrative accesses by the administrative entity device 104 and possibly by one or more other instances of related administrative entity devices not explicitly shown in the figure. Such multiple administrative entity devices in some embodiments can be configured to securely maintain a consistent event counter across those multiple devices.

For example, the cryptographic device 102 in some embodiments maintains the event counter 111 by incrementing the event counter 111 responsive to grant of the given administrative access so as to thereby prevent utilization of the corresponding event-based OTP in a subsequent successful administrative access to the cryptographic device. The incrementing of the event counter 111 illustratively involves increasing the event counter by one, but other types of incrementing can be used in other embodiments.

Similar adjustments are made by the administrative entity device 104 to the event counter 111' based on the number of successful administrative accesses that the administrative entity device 104 makes to the cryptographic device 102.

In some embodiments, the cryptographic device 102 compares the event-based OTP received from the administrative entity device 104 to the expected event-based OTP by identifying a window of one or more acceptable event counter values as a function of the current value of the event counter 111, and determining if an event counter value of the received event-based OTP falls within the identified window.

In arrangements of this type, the cryptographic device 102 can implement a "next code required" feature if a given received event-based OTP is sufficiently close to but not exactly the same as the expected event-based OTP. Administrative access is granted in such an arrangement only if the next code matches an expected next code.

Other types of comparison arrangements can be used by the cryptographic device 102 in other embodiments. The term "comparison" as used herein is therefore intended to be broadly construed. For example, in some embodiments, comparing a received event-based OTP to an expected event-based OTP does not require that the cryptographic device 102 actually generate the expected event-based OTP. Instead, the cryptographic device 102 can extract parameters such as the event count and administrative seed value from the received event-based OTP and compare those extracted values to the expected values. Such an arrangement is considered an example of a comparison of the received event-based one-time passcode to an expected event-based one-time passcode determined as a function of a current value of the event counter, as that phrase is intended to be broadly interpreted herein.

In some embodiments, a lockout feature can be included in the cryptographic device 102, which will automatically lock the cryptographic device 102, for at least a predetermined amount of time, in order to prevent administrative access from being granted if a designated threshold number of consecutive unsuccessful access attempts have been made from the same accessing device.

As mentioned previously, the cryptographic device 102 in some embodiments comprises a hardware or software authentication token. Such an authentication token is illustratively configured to generate tokencodes that are combined with a PIN to form a passcode.

Numerous other passcode arrangements are possible, and the term "passcode" as used herein is intended to be broadly construed. A passcode should be understood to encompass any arrangement of words, phrases, numbers or other combinations of characters suitable for user authentication.

Examples of authentication tokens include both time-synchronous and event-synchronous tokens.

In a typical time-synchronous token, the displayed passcodes are based on a secret value and the time of day. An authentication server with access to the secret value and a time of day clock can determine that a given presented passcode is valid.

One particular example of a time-synchronous authentication token is the RSA SecurID® user authentication token, commercially available from RSA Security LLC ("RSA"), part of Dell EMC of Hopkinton, Mass. A time-synchronous authentication token of this type typically generates tokencodes in the form of sets of digits, such as sets of six digits. Each of the tokencodes in a given series of time-synchronous tokencodes is valid only for a particular period of time, such as a minute. Accordingly, the tokencode output of the authentication token in this case is updated approximately once every minute. These update time periods are also referred to as "epochs."

The authentication token may be configured to present tokencodes to a user via a display of the token. Alternatively, the authentication token can be configured to communicate a given tokencode directly from the authentication token to one of the authentication servers 106 over network 105 via a wired connection such as a USB interface or via a wireless connection such as a Bluetooth or NFC connection.

Other types of authentication tokens can be used, including an event-synchronous authentication token, a challenge-response token, a hash-chain token, or a hybrid token that incorporates multiple such capabilities, such as a hybrid time-synchronous and event-synchronous token.

In some embodiments, the cryptographic device 102 comprises a hybrid device that combines functionality of a hardware authentication token and a smartcard. An example of such a cryptographic device is the RSA SecurID® 800 Authenticator, which is a hybrid device that combines an RSA SecurID® token with a smartcard in a USB form factor, providing users with a single cryptographic device for strong authentication without the inconvenience of carrying multiple separate credentials. Such a cryptographic device is both a smartcard and an authentication token.

The cryptographic device 102 and administrative entity device 104 in the FIG. 1 embodiment are implemented as respective processing devices. Each such processing device generally comprises at least one processor and an associated memory, and implements one or more functional modules for controlling certain features of the system 100.

The cryptographic device 102 comprises a processor 120 coupled to a memory 122 and a network interface 124.

The processor 120 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 122 may comprise random access memory (RAM), read-only memory (ROM), flash memory or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered illustrative embodiments. A given such article of manufacture may comprise, for example, a storage device such as a storage disk, a storage array or an integrated circuit containing memory. The term "article of manufacture" as used herein should be understood to exclude transitory, propagating signals.

Such articles of manufacture are considered computer program products as that term is broadly used herein. Other types of computer program products comprising processor-readable storage media can be configured in other embodiments.

The network interface 124 allows the cryptographic device 102 to communicate over the network 105 with the administrative entity device 104, the authentication servers 106 and the protected resources 107, and may comprise one or more conventional transceivers.

One or more of administrative interface 110 and event counter 111 of the cryptographic device 102 may be implemented at least in part in the form of software that is stored in memory 122 and executed by processor 120.

Like the cryptographic device 102, the administrative entity device 104 comprises a processor 130 coupled to a memory 132 and a network interface 134.

The processor 130, like processor 120 in cryptographic device 102, may similarly comprise a microprocessor, a microcontroller, an ASIC, an FPGA, a GPU or other type of processing circuitry, as well as portions or combinations of such circuitry elements.

The 132, like memory 122 in cryptographic device 102, may similarly comprise RAM, ROM, flash memory or other types of memory, in any combination.

The network interface 134 allows the administrative entity device 104 to communicate over the network 105 with the cryptographic device 102, the authentication servers 106 and the protected resources 107, and may comprise one or more conventional transceivers.

The above-noted network interfaces 124 and 134 may also be used to support various types of communication utilizing out-of-band channels.

For example, an out-of-band channel not involving communication over network 105 may be utilized by the administrative entity device 104 to obtain an initial value of the event counter 111' and the administrative seed value 112'. The term "out-of-band channel" in this context is intended to be broadly construed so as to encompass a different network connection than that typically used for communication between the cryptographic device 102 and the administrative entity device 104. More particular examples of out-of-band channels that may be utilized in illustrative embodiments include text messaging channels, email channels, telephony channels, physical delivery channels, etc.

One or more of the event counter 111' and the event-based OTP generator 114 of the administrative entity device 104 may be implemented at least in part in the form of software that is stored in memory 132 and executed by processor 130.

It is to be appreciated that the particular set of elements shown in FIG. 1 for providing cryptographic device administration utilizing event-based OTPs is presented by way of example, and in other embodiments additional or alternative elements may be used. Thus, another embodiment may include additional networks and additional sets of devices, authentication servers or protected resources.

The cryptographic device 102 and the administrative entity device 104 can include additional or alternative elements. For example, the cryptographic device 102 can be configured to include an event-based OTP generator similar to the event-based OTP generator 114 of device 104, for use in generating expected event-based OTPs for comparison with received event-based OTPs. Numerous other arrangements are possible for comparison of received event-based OTPs with expected event-based OTPs.

Also, a variety of different authentication processes may be used in illustrative embodiments. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although illustrative embodiments may incorporate aspects of such processes.

It should also be noted that various types of cryptographic functions disclosed in the above-cited A. J. Menezes reference can be utilized in generating event-based OTPs in the system 100 and comparing received event-based OTPs with expected event-based OTPs in illustrative embodiments herein.

As mentioned previously, various elements of system 100 such as modules associated with cryptographic device 102 and administrative entity device 104 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

For example, at least one of cryptographic device 102 and administrative entity device 104 can be implemented on a processing platform that comprises a plurality of processing devices. One illustrative embodiment of a processing platform that may be used to implement at least a portion of at least one of devices 102 and 104 comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system 100.

These and other types of cloud infrastructure can be used to provide what is also commonly referred to as a multi-tenant environment. One or more platform components such as virtual machines, or portions thereof, are illustratively implemented for use by tenants of such a multi-tenant environment.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of Linux container (LXC) implemented using a kernel control group. The containers may run on virtual machines in a multi-tenant environment, although other arrangements are possible. The containers may be utilized to implement a variety of different types of functionality within the system 100. For example, containers can be used to implement respective instances of a plurality of cryptographic devices and administrative entity devices of a cloud-based system. Again, containers may be used in combination with other virtualization infrastructure such as virtual machines implemented using a hypervisor.

Another illustrative embodiment of a processing platform that may be used to implement at least a portion of system 100 comprises a plurality of processing devices which communicate with one another over at least one network.

The operation of the cryptographic device 102 in processing administrative access attempts received via its administrative interface 110 is illustrated in more detail in the flow diagram of FIG. 2. In this embodiment, an exemplary process for cryptographic device administration utilizing event-based OTPs is performed by the cryptographic device 102 and includes steps 200 through 208.

In step 200, event counter 111 of the cryptographic device 102 is initialized in the manner previously described. It is also assumed that administrative seed value 112 is stored by the cryptographic device 102 and has been provided to the administrative entity device 104 via an out-of-band channel for storage as administrative seed value 112'. The initial value of the event counter 111 is similarly provided to the administrative entity device 104 via the out-of-band channel for use in initializing the event counter 111'. Other techniques can be used to supply the initial value of the event counter and the administrative seed value to the administrative entity device 104.

In step 202, the cryptographic device 102 receives an event-based OTP for administrative access to the device. The event-based OTP is illustratively received via the administrative interface 110, and may be received from the administrative entity device 104 or from another device of the system 100. In some cases, the entity attempting to obtain administrative access is a legitimate administrative entity, such as the security administrator or other administrative entity associated with administrative entity device 104, but the entity could instead be an attacker trying to improperly obtain administrative access from another device in order to undermine the security of the cryptographic device 102.

In step 204, a determination is made in the cryptographic device 102 as to whether or not the received event-based OTP matches the expected event-based OTP. If the received event-based OTP matches the expected event-based OTP, the process moves to step 206, and otherwise moves to step 208 as indicated. In some embodiments, exact matches are not required. For example, an event counter value extracted from the received event-based OTP may fall within a window of acceptable event counter values, thereby indicating a match. The term "match" as used herein is therefore intended to be broadly construed. Also, an expected event-based OTP need not be expressly generated by the cryptographic device 102. Instead, event counter and administrative seed values can be extracted from the received event-based OTP and compared to corresponding expected values of an expected event-based OTP. Numerous other comparison arrangements and associated match criteria can be used in other embodiments.

In step 206, which is reached if the received event-based OTP matches the expected event-based OTP, the cryptographic device 102 grants administrative access and increments the event counter 111 to reflect the successful access attempt. The process then returns to step 202 to await another administrative access attempt, possibly after also waiting for a termination of the current administrative access.

In step 208, which is reached if the received event-based OTP does not match the expected event-based OTP, the cryptographic device 102 denies administrative access and does not increment the event counter 111. The process then returns to step 202 to await another administrative access attempt.

The particular processing operations and other system functionality described above in conjunction with the flow diagram of FIG. 2 are presented by way of illustrative example only, and should not be construed as limiting the scope of the disclosure in any way. Alternative embodiments can use other types of processing operations for implementing administrative access control using event-based OTPs. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to support multiple instances of administrative access control functionality for different cryptographic devices or different portions of a given cryptographic device.

Functionality such as that described in conjunction with the flow diagram of FIG. 2 can be implemented at least in part in the form of one or more software programs stored in memory and executed by a processor of a processing device of the type described elsewhere herein. A memory or other storage device having executable program code of one or more software programs embodied therein is an example of what is more generally referred to herein as a "processor-readable storage medium."

The FIG. 2 process illustratively replaces a static access code for administrative access to the cryptographic device 102 with an arrangement in which the administrative entity device 104 generates event-based OTP as a function of an internal event counter and an administrative seed value. The current value of the event counter and the administrative seed value are used together to generate the event-based OTP. The cryptographic device 102 includes similar logic to determine an expected event-based OTP based on the current value of its event counter and its stored administrative seed value.

As indicated previously, in some embodiments, the expected event-based OTP can be characterized by a window corresponding to a limited number of events relative to a previous successful administrative access.

Additionally or alternatively, some embodiments can require a sequence of two or more consecutive correct administrative event-based OTPs if either a specific number of failed attempts were encountered or a given received event-based OTP was found to be outside the expected event window as determined by the cryptographic device 102.

As indicated previously, illustrative embodiments can also incorporate various types of protective lockout mechanisms. For example, the cryptographic device 102 can be configured to at least temporarily disable the administrative access after a particular number of failed administrative access attempts.

The embodiments described in conjunction with FIGS. 1 and 2 provide significant advantages relative to conventional practice.

For example, these embodiments provide enhanced security in a cryptographic device by providing an administrative interface that does not require utilization of a PUK or other type of static access code that once compromised effectively destroys the security of the cryptographic device.

Another advantage of some embodiments is that such arrangements can facilitate administrative modifications to cryptographic devices in a wide variety of different situations in which allowing an administrative change to a given cryptographic device would be beneficial to a user of that device. For example, the administrative access control based on event-based OTPs can allow an administrator to remotely unlock a cryptographic device for which the user PIN has become locked.

Moreover, event-based OTPs presented to gain administrative access to a cryptographic device cannot subsequently be replayed by an adversary to obtain another access. Accordingly, the disclosed arrangements are highly secure.

It should again be emphasized that the above-described embodiments are presented for purposes of illustration only. Many variations and other alternative embodiments may be used. For example, the techniques are applicable to a wide variety of other types of authentication systems and processing devices that can benefit from enhanced security in administrative access to cryptographic devices. Also, the particular configuration of system and device elements shown in FIG. 1, and the associated administrative access control process using event-based OTPs as described in conjunction with FIG. 2, can be varied in other embodiments. In addition, the particular configurations of event counters, administrative seed values and event-based OTP generators may be varied to meet the needs of various implementations. These and numerous other alternative embodiments within the scope of the appended claims will be readily apparent to those skilled in the art.

What is claimed is:

1. An apparatus comprising:
a cryptographic device comprising a processor coupled to a memory;
the cryptographic device being configured:
to maintain an event counter characterizing a number of successful administrative accesses to the cryptographic device;
to receive an event-based one-time passcode for a given administrative access attempt;
to compare the received event-based one-time passcode to an expected event-based one-time passcode determined as a function of a current value of the event counter by:
identifying a window of having a plurality of acceptable event counter values as a function of the current value of the event counter, and,
determining if an event counter value of the received event-based one-time passcode falls within the identified window; and
to grant or deny the given administrative access attempt based at least in part on a result of the comparing.

2. The apparatus of claim 1 wherein the cryptographic device is further configured to store an administrative seed value.

3. The apparatus of claim 2 wherein the expected event-based one-time passcode is determined as a function of the administrative seed value and the current value of the event counter.

4. The apparatus of claim 1 wherein the cryptographic device comprises a smartcard.

5. The apparatus of claim 1 wherein the cryptographic device comprises at least one of a hardware authentication token and a software authentication token.

6. The apparatus of claim 1 wherein the cryptographic device comprises an Internet-of-Things (IoT) device.

7. The apparatus of claim 1 wherein the cryptographic device comprises an administrative access interface via which the event-based one-time passcode is received.

8. The apparatus of claim 7 wherein the administrative access interface does not require submission of a static unlock code for a successful administrative access.

9. The apparatus of claim 1 wherein the event counter is set to an initial value in conjunction with manufacture of the cryptographic device.

10. The apparatus of claim 9 wherein the initial value comprises one of zero and a random value.

11. The apparatus of claim 1 wherein maintaining the event counter comprises incrementing the event counter for each of a plurality of successful administrative accesses to the cryptographic device.

12. The apparatus of claim 1 wherein maintaining the event counter comprises incrementing the event counter responsive to grant of the given administrative access so as to thereby prevent utilization of the event-based one-time passcode in a subsequent successful administrative access to the cryptographic device.

13. The apparatus of claim 1 wherein an initial value of the event counter and an administrative seed value are provided to an administrative entity via an out-of-band channel for use by the administrative entity in generating event-based one-time passcodes for respective administrative access attempts.

14. A method comprising:
maintaining an event counter characterizing a number of successful administrative accesses to a cryptographic device comprising a processor coupled to a memory;
receiving an event-based one-time passcode for a given administrative access attempt;
comparing the received event-based one-time passcode to an expected event-based one-time passcode determined as a function of a current value of the event counter by:
identifying a window having a plurality of acceptable event counter values as a function of the current value of the event counter, and
determining if an event counter value of the received event-based one-time passcode falls within the identified window; and
granting or denying the given administrative access attempt based at least in part on a result of the comparing;
wherein the maintaining, receiving, comparing and granting or denying are performed by the cryptographic device.

15. The method of claim 14 wherein the cryptographic device is further configured to store an administrative seed value.

16. The method of claim 15 wherein the expected event-based one-time passcode is determined as a function of the administrative seed value and the current value of the event counter.

17. A computer program product comprising a non-transitory processor-readable storage medium having embodied therein one or more software programs, wherein the one or more software programs when executed by a cryptographic device comprising a processor coupled to a memory cause the cryptographic device:
to maintain an event counter characterizing a number of successful administrative accesses to the cryptographic device;
to receive an event-based one-time passcode for a given administrative access attempt;
to compare the received event-based one-time passcode to an expected event-based one-time passcode determined as a function of a current value of the event counter by:
identifying a window having a plurality of acceptable event counter values as a function of the current value of the event counter, and
determining if an event counter value of the received event-based one-time passcode falls within the identified window; and
to grant or deny the given administrative access attempt based at least in part on a result of the comparing.

18. The computer program product of claim 17 wherein the cryptographic device is further configured to store an administrative seed value.

19. The computer program product of claim 18 wherein the expected event-based one-time passcode is determined as a function of the administrative seed value and the current value of the event counter.

* * * * *